Feb. 27, 1940.    C. C. FARMER    2,191,822
SPEED CONTROLLED BRAKE
Filed Nov. 6, 1937    2 Sheets-Sheet 2
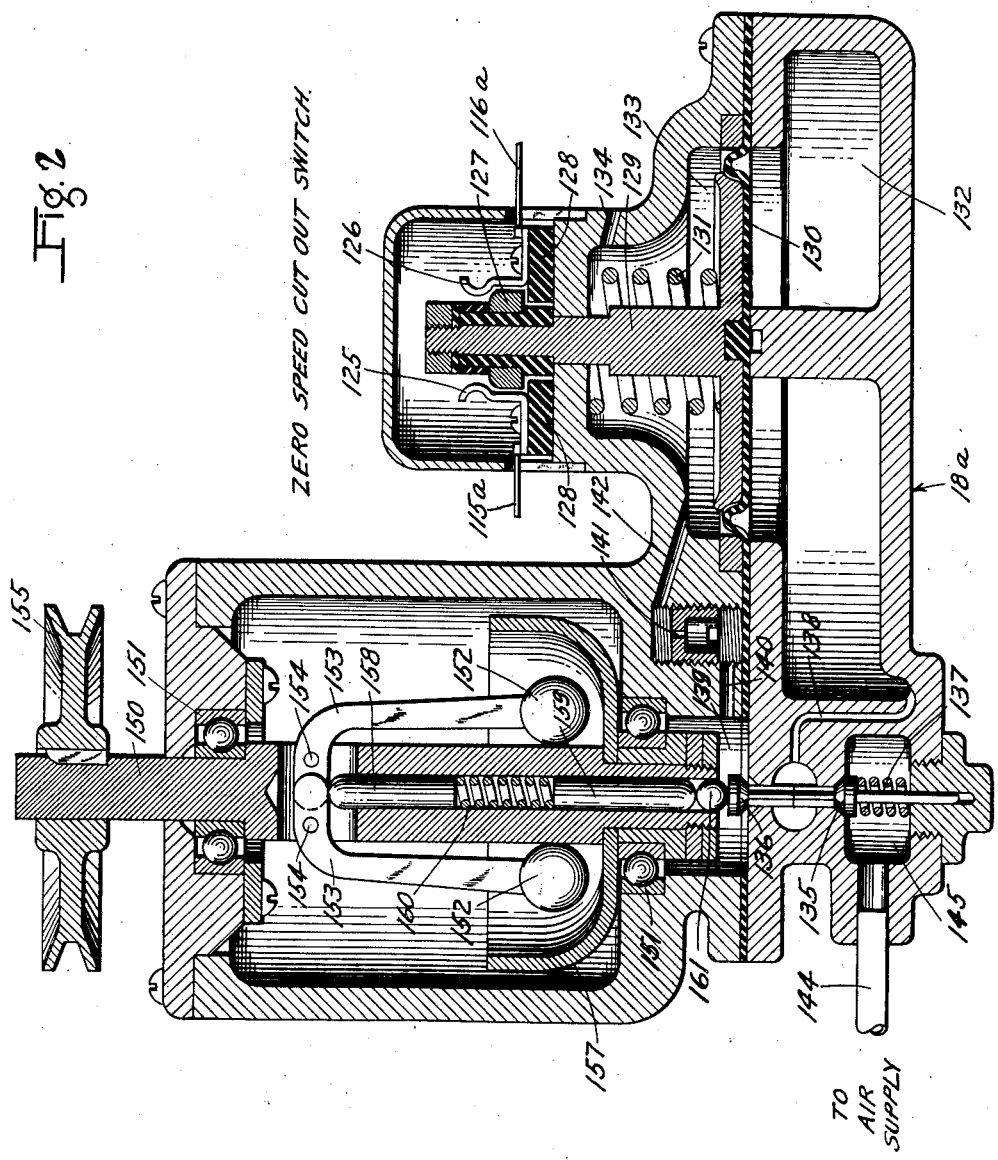
INVENTOR
CLYDE C. FARMER
BY Wm. M. Cady
ATTORNEY Patented Feb. 27, 1940

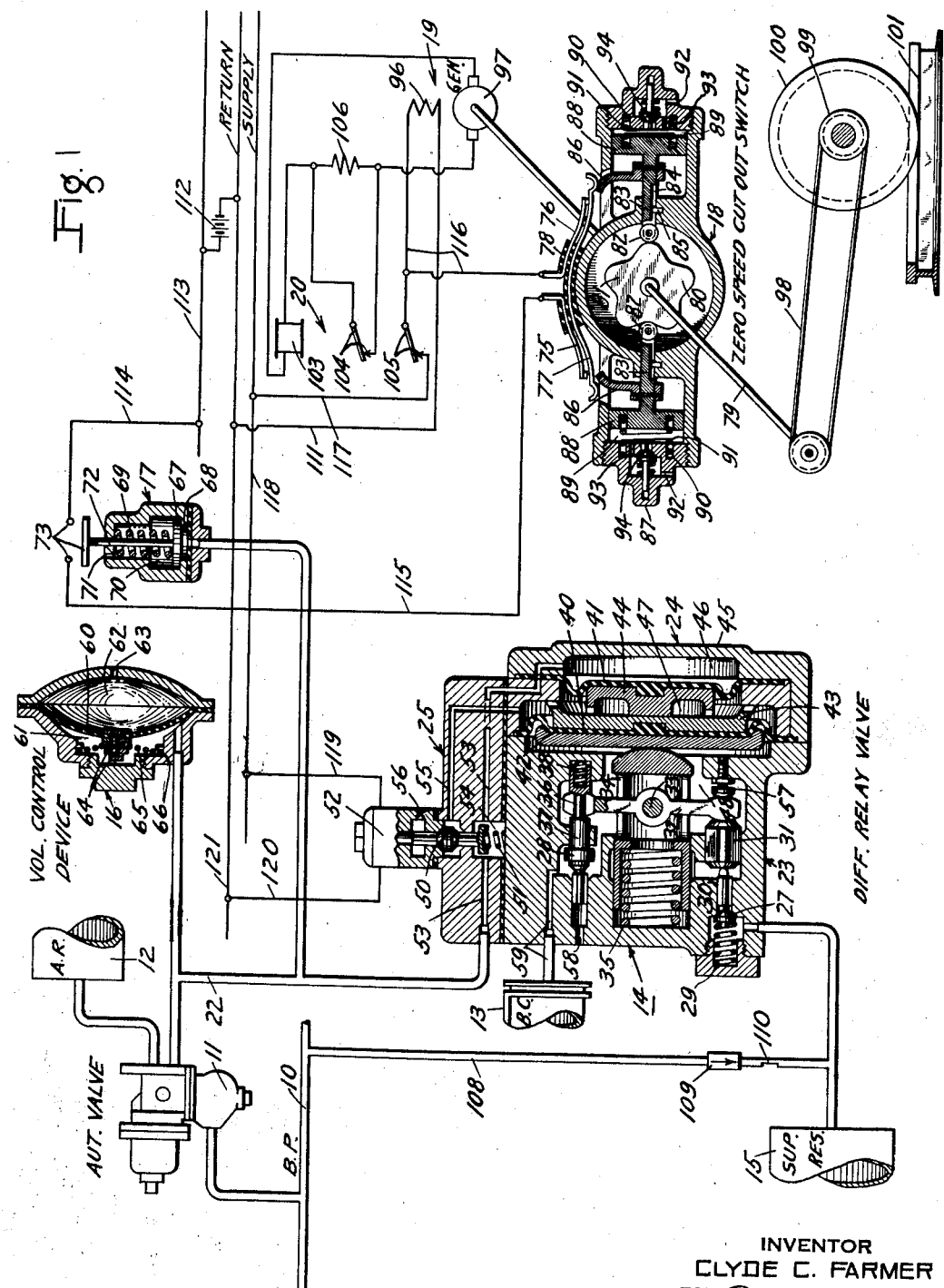

2,191,822

UNITED STATES PATENT OFFICE 2,191,822

SPEED CONTROLLED BRAKE

Clyde C. Farmer, Pittsburgh, Pa., assignor to The Westinghouse Air Brake Company, Wilmerding, Pa., a corporation of Pennsylvania Application November 6, 1937, Serial No. 173,169

17 Claims. (Cl. 303—21)

This invention relates to speed controlled brakes, and more particularly to brakes for railway trains and traction vehicles in which the degree of braking is controlled with relation to the speed of the train or vehicle.

With the introduction of trains and traction vehicles designed for operation at speeds higher than heretofore usual, new problems have been introduced in controlling the degree of application of the brakes so as to minimize or prevent the occurrence of wheel sliding. As is well known, wheel sliding is objectionable not only because it damages the wheels which slide, but also because the retarding effect produced by a sliding wheel is considerably less than that produced by a wheel rolling at normal speed.

When a train or vehicle is traveling at a relatively high rate of speed the brakes must be applied to a maximum or to very high degree if a reasonably short stop is to be made. It has been found that this high degree of application initiated at the high speed may be maintained until the train or vehicle has decelerated to a relatively low speed, at which time it is necessary to promptly reduce the degree of the brake application if wheel sliding is to be avoided. In many instances it has been found necessary and desirable to reduce the degree of the brake application in several steps as the train or vehicle speed diminishes, in order to obtain the maximum possible braking permissible throughout a stop consistent with minimum danger of wheel sliding. An example of a brake equipment for trains and vehicles providing for such step reductions is shown and claimed in the pending application of Ellis E. Hewitt, Serial No. 88,098, filed June 30, 1936, now Patent No. 2,140,624, issued December 20, 1938. In this brake equipment the initial degree of application of the brakes is determined according to the speed range in which the train or vehicle is operating at the time the brake application is initiated. When the brakes are thus applied, in a given speed range, the degree of the application is stepped off as the speed of the train or vehicle diminishes.

In a number of instances it is not wholly essential that the initial degree of the application be graduated according to the speed range in which the train or vehicle is operating at the time the brake application is initiated, nor is it necessary to step off the brake application in a plurality of steps as the speed diminishes. Nevertheless, if wheel sliding is to be avoided near the end of the deceleration period, it is essential that at that time the degree of the brake application be reduced to some safe value. To meet this requirement it is generally adequate to reduce the initial degree of application to some low value at some relatively low speed, as for example at twenty-five miles per hour.

With the latter consideration in mind it is a principal object of the present invention to provide a brake equipment wherein during deceleration the degree of application of the brakes will be automatically diminished at a predetermined reduced train or vehicle speed.

A further object of the invention is to provide a brake equipment with the parts so arranged that if the brake application is initiated at a time when the train or vehicle is traveling above a certain predetermined speed, the degree of the application will be maintained substantially constant until the train or vehicle has decelerated to said predetermined speed, at which time the degree of the application will automatically be diminished to a value which bears a fixed relation to the initial degree of the application.

A yet further object of the invention is to provide a brake equipment employing an electrically controlled valve mechanism which is controlled by a speed operated device in a manner such that by electrical operation the valve mechanism is caused to modify the degree of application of the brakes from one value to another value which bears a substantially fixed relation to the first.

It is sometimes necessary to maintain the brakes applied while a train or vehicle is at rest. Such a period may extend over a rather long interval of time. If the brake apparatus employs an electrically operated valve device, such as referred to in the last stated object, it may occur that this electrically operated valve device is maintained energized over this long standing period. The source of electric current available for energizing the electrically operated valve device is usually a battery, and if the electrically operated valve device is constantly energized from the battery for such long periods of time the charge on the battery may be depleted and electric energy may not be available during a running period when most needed. To avoid a possibility of depleting the source of electrical energy, it is preferred that the electrically operated valve device be deenergized after the train or vehicle has been brought to rest, and the brakes yet remain applied to a degree sufficient to insure that the train will not be moved unintentionally. It is a further object of the present invention to provide an electrically operated valve mechanism and in connection therewith a cut-out switch device which will function at or about the time the train or vehicle comes to rest to deenergize the electrically operated valve mechanism.

In connection with the last referred to feature, it is a further object of the invention to provide one or more improved forms of cut-out switches of the speed controlled type, which may be operated according to the train or vehicle speed, so that when the speed diminishes to substantially zero, or to a low chosen speed, the switch device is operated to control the electrically operated valve device as intended.

Other objects and advantages of the invention will be more fully appreciated from the following description, which is taken in connection with the attached drawings, wherein Fig. 1 shows in schematic and diagrammatic form an adaptation of the invention to one car of a train.

Fig. 2 shows in diagrammatic form a type of cut-out switch device that may be substituted for that shown in Fig. 1.

In illustrating a form of the invention, it has been applied to a brake equipment of the automatic type. It is to be understood, however, that the invention is not limited to any particular type of brake equipment, but may apply equally well to either the automatic type or the straight air type, or to equipments which employ both straight air and automatic portions. Further, while the embodiment is shown for a single car, its adaptation to a train of cars will be readily apparent.

As illustrated, the automatic type of brake equipment shown comprises a brake pipe 10 having connected thereto an automatic valve device 11, and connected to this valve device is an auxiliary reservoir 12.

A brake cylinder is illustrated at 13 for operating a conventional type of friction brake, not shown, and for controlling the supply of fluid under pressure to and its release from this brake cylinder a differential relay valve device 14 is provided. Connected to this differential relay valve device as a source of supply of fluid under pressure is a supply reservoir 15.

The automatic valve device 11 controls the operation of the differential relay valve device 14 in conjunction with a volume control device 16.

For controlling an operation of the differential relay valve device 14, there are provided a pneumatic switch device 17, a zero speed cut-out switch device 18, an electric generator 19, and a control relay 20.

Considering now more in detail the devices above enumerated, the automatic valve device 11 may be considered to be of conventional design, as for example a standard triple valve device of the well known Westinghouse type. Briefly stated, this device functions so long as the brake pipe 10 is charged to a substantially constant pressure value to maintain the auxiliary reservoir 12 charged therefrom. Upon a reduction of pressure in the brake pipe 10, the automatic valve device 11 functions to supply fluid under pressure from the auxiliary reservoir 12 to a brake application pipe 22. Upon a restoration of pressure in the brake pipe 10, following the aforementioned reduction of pressure, the automatic valve device 11 operates to release fluid under pressure from the pipe 22, and to recharge the auxiliary reservoir 12.

The differential relay valve device 14 comprises a relay valve section 23, a diaphragm section 24, and a magnet valve section 25.

The relay valve section 23 is provided with a supply valve 27 and a release valve 28. The supply valve 27 is urged toward a seated position by a spring 29, and has a fluted stem 30 which engages one end of a slidable plunger 31. This plunger 31 slides in a bore in the valve device casing, and its other end engages the lower end of a lever 32. The lever 32 is pivotally mounted near its center on a pin 33 carried by a hollow cylindrical plunger member 34. The member 34 is biased to the right by a spring 35.

The upper end of the lever 32 is bifurcated and embraces a reduced portion 36 of a plunger 37 disposed and slidable in a bore in the casing. The left hand end of the plunger 37 is secured to the release valve 28, while the right hand end is recessed to contain a biasing spring 38 reacting between that end and a portion of the casing.

The diaphragm section 24 comprises two flexible diaphragms 40 and 41 disposed in spaced coaxial relationship. The diaphragm 40 is provided on one side with follower plate 42 and on the other side with spacing member 43, these two members being secured to and movable with the diaphragm. The diaphragm 41 is provided only with a spacing member 44 on the one side as shown. The two diaphragms are not connected in any way, so that each may move individually with respect to the other.

The diaphragm section 24 has a cap member 45 arranged so as to define with the diaphragm 41 a chamber 46, and the two diaphragms 40 and 41 defined therebetween a second chamber 47. To the left of the diaphragm 40 is a chamber 48 containing the valve mechanism of the relay valve section 23.

The magnet valve section 25 has associated therewith a double beat valve 50, which is urged toward an upper seated position by a spring 51. An electromagnet 52 is so arranged that when energized it shifts the double beat valve 50 from its upper seated position, as illustrated, to its lower seated position, against the opposition of the spring 51.

The magnet valve section 25 contains a passage 53 to which the aforementioned brake application pipe 22 is connected. This passage extends to the chamber 46 to the right of diaphragm 41, and in so doing passes through a chamber 54 below the double beat valve 50. When the double beat valve 50 is in its upper seated position, the chamber 54 is placed in communication with the chamber 47, between the two diaphragms 40 and 41, by way of passage 55. When the double beat valve 50 is in lower seated position, this communication is cut off and the chamber 47 is placed in communication with the atmosphere by way of passage 55, past the open upper seat of double beat valve 50, and a restricted exhaust port 56.

When fluid under pressure is supplied to the brake application pipe 22 at a time when the double beat valve 50 is in its upper seated position, fluid under pressure flows to both of the chambers 46 and 47, through the communications just described. It will be apparent that in such a case the diaphragm 41 will be subject on both sides to the same fluid pressure, while the diaphragm 40 is subject on one side only to fluid pressure. As a consequence, the diaphragm 40 will flex to the left and shift the movable member 34 with it against the bias of spring 35.

Upon this movement the member 34 will carry with it the lever 32. As the lever 32 moves, it first fulcrums about its lower end between the right hand end of plunger 31 and an adjustable stop member 57, and the upper end of the lever swings to the left to seat the release valve 28. The seating of this release valve closes communication between the chamber 48 and an exhaust port 58.

As the release valve seats, the lever 32 fulcrums about its upper end so that the lower end swings to the left and unseats the supply valve 27. Fluid under pressure will then flow from the supply reservoir 15 to the chamber 48, and from there to the brake cylinder 13 by way of pipe and passage 59. As the pressure in chamber 48 and in brake cylinder 13 rises and attains a value substantially equal to the pressure in chamber 47, the diaphragm 40 will move to the right until such time as the supply valve 27 is seated. The supply to the brake cylinder 13 and chamber 48 will then be cut off and brake cylinder pressure will be equal to the pressure in chamber 47.

If now following the operation just described the double beat valve 50 is shifted to lower seated position, fluid under pressure will be released from the chamber 47 to the atmosphere. As the pressure in chamber 47 diminishes, which it will do slowly due to the presence of the restricted port 56, diaphragm 40 moves to the right and permits release valve 28 to be unseated. Fluid under pressure will be then released from brake cylinder 13 and chamber 48, but at a predetermined brake cylinder pressure the release valve 28 will be seated due to movement of diaphragm 40 to the left. This movement will be caused by the maintained pressure in chamber 46 acting on diaphragm 41. And since the area of diaphragm 41 is less than the area of diaphragm 40 subject to pressure in chamber 48, it will be quite apparent that the pressure in chamber 48 and brake cylinder 13 will bear to the pressure in chamber 46 the same ratio that diaphragm 41 bears to diaphragm 40.

Thus upon movement of the double beat valve 50 to lower seated position, brake cylinder pressure is reduced from the initially established value to a lower value which bears a fixed ratio to the initial value by the same ratio that the area of diaphragm 41 bears to the area of diaphragm 40. If, subsequently, fluid under pressure is also released from the chamber 46, brake cylinder pressure will be diminished correspondingly.

In standard automatic brake systems the automatic valve device 11 usually supplies fluid under pressure direct to a connected brake cylinder. In the brake cylinder the piston therein moves outwardly as the pressure in the brake cylinder rises. This outward movement of the piston increases the brake cylinder volume and necessarily affects the ultimate pressure attained. In order to duplicate in the equipment illustrated more nearly the same conditions which normally exist in a standard brake system for a given reduction in brake pipe pressure, the automatic valve device 11 supplies fluid under pressure not only to the chambers of the differential relay valve device 14, but also to the volume control device 16.

This device is embodied in a casing having disposed therein a flexible diaphragm 60 which with the casing defines two chambers 61 and 62. The chamber 62 is constantly open to the atmosphere by way of port 63, while the chamber 61 is in open communication with the brake application pipe 22. Connected to the left side of the diaphragm 60 by members 64 is a spirally wound spring 65, the outer periphery of which rests in an annular recess 66 in the device casing. When fluid under pressure is supplied to the chamber 61, the diaphragm 60 moves to the right against opposition of the spring 65, thus duplicating the conditions which exist when fluid under pressure is supplied from the automatic valve device to a standard brake cylinder. It follows, therefore, that for a given reduction in brake pipe pressure the pressure produced in the brake application pipe, and in the connected volumes, will be the same as produced in a brake cylinder for a like brake pipe reduction in a standard automatic brake system.

The volume control device is described and claimed per se in the pending application of Ellis E. Hewitt, Serial No. 156,693, filed July 31, 1937.

Considering now the pneumatic switch device 17, this device has embodied therein a piston 67 which is subject on its lowermost side to pressure of fluid in chamber 68, and on its uppermost side to pressure of a spring 69 disposed in a chamber 70 always open to the atmosphere by way of port 71. The piston 67 has secured thereto a stem 72 which carries insulated therefrom one member of a set of contacts 73.

When the chamber 68 is at atmospheric pressure, or when the pressure therein is below two or three pounds, the spring 69 biases the piston 67 downwardly, as shown, and contacts 72 are opened. When the pressure in chamber 68 exceeds two or three pounds the piston 67 moves upwardly and closes contacts 73.

Considering now the zero speed cut-out switch device 18, the switch elements of this device comprise contact fingers 75 and 76, and bridging contact member 77. These three contact members are insulated from each other and are carried by an insulating member 78.

Within the switch device casing there is rotatably disposed a shaft 79 having secured thereto a star-shaped cam 80. This cam is provided with an odd number of projections 81 which are adapted to engage rollers 82 associated with plungers 83. The plungers 83 have recesses 84 therein engaging pins 85 to prevent turning of the plungers in the bores in which they are disposed. Each plunger carries thereon a lug 86, which is adapted when the plunger is moved outwardly, that is, away from the cam 80, to engage one end of the bridging contact 77. When the plungers 86 are retracted inwardly toward the cam 80, they disengage from the respective ends of the bridging contact member.

Now when the shaft 79 is rotated the two plungers 83 are forced outwardly by intermittent engagement with the projections 81 of cam 80, and are maintained outwardly by the action of a dash-pot mechanism associated with each plunger. Each dash-pot mechanism comprises a piston 88 movable in a chamber 89. Disposed in the chamber 89 between the piston 88 and an annular groove 90 in a cap member 87 is a spring 91. Also, between the chamber 89 and an exhaust port 92 is a restricted port 93, while associated in parallel with the port 93 is an enlarged port 94 controlled by a spring seated valve 94.

Upon a quick movement of the piston 88 outwardly a low pressure thus created in chamber 89 will unseat the valve 94, and the piston 88 may move with opposition exerted only by the spring 91. When the piston 88 tends to move inwardly toward the cam 80, by action of spring 91, the valve 94 seats and the admission of air to chamber 89 is by way of the restricted port 93. As a consequence, the movement of the piston 88 inwardly is greatly retarded.

It should now be obvious that once the two plungers 83 are actuated outwardly by rotation of the cam 80 the lug members 86 will remain in the outward position to cause the bridging contact 77 to engage and connect together the contact fingers 75 and 76, until such time as the cam 80 practically ceases rotating. When the cam ceases rotating, at least one piston 88 is free to move inwardly, but due to the retarded action imposed by the restricted port 93 a short interval of time will elapse before it has moved inwardly far enough to permit the bridging contact member 77 to disconnect the contact fingers 75 and 76.

The electric generator 19 may be of conventional design, and as diagrammatically illustrated comprises a field member 96 and an armature member 97. The generator is preferably of the type whose voltage output varies in accordance with the speed of operation thereof, that is to say, as the speed of the generator diminishes or increases the voltage output thereof varies accordingly. Of course, a constant speed, variable field, generator might be employed but would add undue complications.

For the simplest arrangement, it is preferred that the generator be formed on or connected to the aforementioned shaft 79 extending through the zero speed cut-out switch device 18. This shaft 18 may be rotated by connection with a vehicle wheel or axle, or any other part which rotates at a speed corresponding to vehicle speed. As illustrated, the shaft is connected by a V-belt 98 to a pulley 99 associated with the vehicle wheel 100. The wheel 100 is shown as rolling on a track rail 101.

Considering now the control relay 20, this relay is provided with an electromagnet winding 103 and two sets of contacts 104 and 105. When the winding 103 is deenergized each of the two sets of contacts is closed. When the winding 103 is energized to or above a certain degree each set of contacts is opened. Shunted across the contacts 104 is a resistance 106, the purpose of which will be described more fully hereinafter.

Further understanding of the invention will be best facilitated by describing the operation of the embodiment thus far considered.

*Operation*

When the brakes are released the brake pipe 10 is charged to a predetermined pressure value. The automatic valve device 11 then charges the auxiliary reservoir 12 to brake pipe pressure. At the same time, the supply reservoir 15 is charged from the brake pipe by way of branch pipe 108 and one-way check valve device 109. Between the check valve device 109 and the supply reservoir 15 is disposed a restriction 110. The check valve device 109 prevents back flow from the supply reservoir to the brake pipe, while the restriction 110 prevents undue fluctuations in brake pipe pressure due to a reduction of pressure in the supply reservoir.

When the train is running, the shaft 79 will be driven at a speed corresponding to train speed. In the zero speed cut-out switch device 18, the lugs 86 will be forced outwardly and will remain there due to the action of the dash-pot mechanisms, and the two contact fingers 75 and 76 will be as a consequence connected together by the bridging contact 77. At the same time, the generator 97 will be operating at a speed corresponding to train or vehicle speed, but will not deliver a voltage output until its field winding 96 has been excited.

Now the relay winding 103 is connected across the armature 97 of the generator 19, and is so designed that so long as the voltage delivered by the generator is above a certain value corresponding to a chosen low vehicle speed, it will be sufficiently energized to hold contacts 104 and 105 open. Maintaining contacts 105 opened holds the electromagnet 52, in the differential relay valve device 14, energized, as will appear more fully hereinafter.

When it is desired to effect an application of the brakes, the brake pipe pressure is reduced in the usual way, and the automatic valve device 11 responds thereto, to supply fluid under pressure from the auxiliary reservoir 12 to the brake application pipe 22. From the brake application pipe fluid under pressure flows to chamber 65 in the volume control device 16, to chamber 68 in the switch device 17, and to the two chambers 46 and 47 in the differential relay valve device.

As the pressure of fluid supplied to the chamber 68 in the switch device 17 rises above two or three pounds, the piston 67 moves upwardly to close contacts 73. This closes a circuit between a battery 112 and the generator field winding 96. Assuming that the vehicle speed is above a chosen low value, the relay 20 will open its contacts 104 and 105, the opening of the latter contacts preventing energization of the electromagnet 52. The circuit to the generator field winding, from battery 112, comprises conductors 113 and 114, contacts 73 of switch device 17, conductor 115, contacts 75, 76 and 77 of cut-out switch device 18, and conductor 116, the return circuit being by way of conductors 111 and 121.

The volume control device 16 is provided to establish the desired ratio between brake application pipe pressure and brake pipe reduction, as previously explained.

The differential relay valve device will operate upon establishment of pressure in chambers 46 and 47 to supply fluid under pressure from the supply reservoir 15 to the brake cylinder 13, brake cylinder pressure ultimately corresponding substantially to the pressure established in the chambers 46 and 47.

Now as the speed of the train diminishes due to application of the brakes, the voltage delivered by the generator 19 will likewise diminish. When this voltage has diminished to a value corresponding to a chosen low train speed, as for example twenty-five miles per hour, the relay winding 103 will be insufficiently energized to hold the contacts 104 and 105 open. As a consequence these contacts will close. The closing of contacts 105 establishes a circuit between battery 112 and the electromagnet 52, which beginning at the battery includes train battery conductor 113, branch conductor 114, switch contacts 73, conductor 115, cut-out switch members 75, 76 and 77, conductor 116, contacts 105, conductor 117, train supply conductor 118, branch conductor 119, and the electromagnet 52, the return circuit to the battery 112 being by way of branch conductor 120 and train return conductor 121.

With the electromagnet 52 thus energized the double beat valve 50 is shifted to lower position to exhaust the pressure of fluid in the chamber 47. As previously described, this places the smaller diaphragm 41 in control of brake cylinder pressure, and brake cylinder pressure will be reduced to a value which bears a ratio to the initial value in the same relation that the area of diaphragm 41 bears to diaphragm 40. Thus brake cylinder pressure will be reduced by a predetermined ratio.

It is intended that the lower brake cylinder pressure will be a value which is unlikely to cause sliding of the vehicle wheels. The changeover from control by diaphragm 40 to control by diaphragm 41, in the differential relay valve device, is accomplished smoothly due to the fact that the pressure of fluid in chamber 47 is exhausted slowly through the restricted port 56. Thus not only is wheel sliding guarded against, but irregular changes in rate of retardation is prevented by the gradual change in brake cylinder pressure.

The closing of the relay contacts 104 shunts the resistance 106 which was placed in series with the relay winding 103 when these contacts were opened. The resistance 106 and the contacts 104 are provided for the purpose of causing the relay 20 to open and close contacts 105 at the same predetermined speed, regardless of whether the train is accelerating or decelerating. When the train is accelerating the resistance 106 is not in circuit with the winding 103 and the contacts 105 will be opened at the desired predetermined speed. As contacts 104 open, the resistance 106 is placed in series with the winding 103, so that as the voltage across the winding 103 diminishes the magnetic lag of the winding will be compensated for and it will close contacts 105 at the same speed at which they were opened.

Now if the train were brought to a stop and stood at rest for a long time with the electromagnet 52 maintained energized from the battery 112, the charge of the battery might be completely depleted. After the train has been stopped it is not important whether brake cylinder pressure corresponds to the initial high pressure or to the reduced pressure. And it may even be desirable that brake cylinder pressure be restored to the initial high value. In any event, to avoid a drain on the battery the zero speed cut-out switch device 18 is provided to disconnect the magnet valve device 52 from the battery 112 as the train comes to rest, even though it results in reestablishing the initial high brake cylinder pressure.

As the train stops and the shaft 79 ceases rotating, the star-shaped cam 80 will assume a position such that at least one of the plungers 83 will be retracted inwardly toward the cam, such for example as is illustrated in Fig. 1. The bridging contact member 77 will then disconnect the contacts 75 and 76, and the circuit to the electromagnet 52 is thereby interrupted.

It is to be observed, however, that due to the action of the dash-pot mechanism this interruption of the electromagnet circuit will not take place until the elapse of a definite interval of time after the cam 80 has ceased rotating. This additionally guards against wheel sliding at the very end of the stop, by insuring that the initially high brake cylinder pressure will not be reestablished until the vehicle wheels have actually ceased rotating.

When the zero speed cut-out switch device interrupts the circuit to the electromagnet 52, it also interrupts the exciting circuit to the generator field winding 96, so that this winding will not produce a drain on the battery 112.

If now the brakes are completely released by restoring the brake pipe pressure to its normal value, the brake application pipe 22, and the connected volumes, will be placed in communication with the atmosphere, and the switch device 17 will open its contact 73. At the same time, the differential relay valve device will release fluid under pressure from the brake cylinder to completely release the brakes.

*Modification of Fig. 2*

This figure shows a form of zero speed cut-out switch device 18a which may be substituted for the cut-out switch device 18 employed in Fig. 1. In the new switch device the contact elements corresponding to elements 75, 76 and 77 in Fig. 1, are shown at 125, 126 and 127, respectively. Contacts 125 and 126 connect, respectively, to conductors 115a and 116a, which conductors correspond to their counterparts 115 and 116 in Fig. 1.

The contacts 125 and 126 are supported by insulating members 128, while the contact member 127 is carried by and insulated from a stem 129 associated with a flexible diaphragm 130. A spring 131 disposed concentrically with respect to the stem 129 biases the diaphragm 130 downwardly so that the contact 127 is normally out of engagement with the contact fingers 125 and 126.

The diaphragm 130 is subject on its lowermost side to pressure of fluid in chamber 132. Chamber 133 above the diaphragm is normally at atmospheric pressure due to the open communication provided by port 134. The supply of fluid under pressure to and its release from chamber 132 is controlled by two valves 135 and 136, which have fluted stems arranged in abutting relationship. A spring 137 acting on the valve 135 functions to urge said valve seated and the valve 136 unseated. When the valve 135 is seated and the valve 136 is unseated, as illustrated, chamber 132 is connected to the atmosphere by way of passage 138, past the unseated valve 136, chamber 139, passage 140, a plug fitting containing a restriction 141, passage 142, chamber 133, and exhaust port 134.

When the valve 136 is seated, this exhaust communication is closed, and when at the same time the valve 135 is unseated, fluid under pressure is supplied from a suitable source, as for example the supply reservoir 15, to the chamber 132 by way of pipe 144, chamber 145, past the unseated valve 135, and passage 138.

For operating the two valves 136 and 135 to seated and unseated positions respectively, there is provided a centrifuge device, as will now be described. The centrifuge device comprises a rotatable member 150 suitably supported on ball bearings 151 in the casing enclosing the zero speed cut-out switch device, which rotatable member has pivotally connected thereto two fly-ball weights 152. Each of these weights is provided with an arm 153 pivoted to the rotatable member 150 and 154.

Secured to the rotatable member 150 is a pulley 155, which is coupled to some part of the vehicle which rotates at vehicle or train speed, as heretofore described in connection with Fig. 1. Also secured to and movable with the rotatable member 150, below the fly-ball weights 152, is a cup-shaped member 157. As the rotatable member 150 is rotated the fly-ball weights 152 fly outwardly until they engage the side walls of the cup-shaped member 157, which act as limit stops. As the fly-ball weights move outwardly, pivoting about the members 154, the innermost ends of the arms 153 engage a plunger 158 disposed in a bore within the rotatable member 150, and move this plunger downwardly.

Disposed between the plunger 158 and a second plunger 159, within the bore of the rotatable member 150, is a spring 160. The downward movement of the plunger 158 is thus transmitted to the plunger 159 through the spring 160. The plunger 159 engages a ball 161 resting on top of the valve 136. Through the medium of this ball sufficient pressure is applied to the valve 136 to seat it and unseat the valve 135, against opposition of the spring 137.

It is to be understood that at train speeds of two or three miles per hour the weights 152 will move outwardly with sufficient force to effect the operation of the valves 135 and 136 as just described, so that fluid under pressure will be supplied to chamber 132 and thus actuate diaphragm 130 upwardly to effect engagement of the switch members 125, 126 and 127 before the train speed has reached an appreciable value.

Now as the train approaches a stop, following application of the brakes, at the aforesaid two or three miles per hour the weights 152 will move inwardly and permit the valves 136 and 135 to assume the illustrated positions. Chamber 132 will thus be connected to the atmosphere by way of the restricted orifice or port 141. A definite interval of time will elapse before the pressure in chamber 132, which is made of sufficient volume to give the desired time characteristic, reduces sufficiently for the contacts 125, 126 and 127 to disengage. Thus as in the zero speed cut-out switch device of Fig. 1, the higher initial brake cylinder pressure will not be restored until the wheels of the train vehicles will have ceased rotating.

It will be seen from the illustration and description of an embodiment of the invention, that I have provided a brake equipment in which the degree of application of the brakes will be automatically diminished to a value bearing a fixed ratio to the initially established value whenever the train speed diminishes to a predetermined speed value. And as the train comes to a stop the cut-out switch device operates to open the energized electrical circuits, so as to conserve the supply of electrical energy.

While the illustrated and described embodiment of the invention comprises a workable form, it is not my intention to be limited to the precise details of this embodiment, or otherwise than according to the spirit and scope of the appended claims.

Having now described my invention, what I claim as new and desire to secure by Letters Patent is:

1. In a vehicle brake system, in combination, an electrically operated valve device operative upon a variation of energization thereof to vary the degree to which the brakes may be applied, an electric relay device for controlling the energization of said electrically operated valve device, an electric generator driven according to the speed of the vehicle for supplying current to energize said relay device, and means controlled by said relay device for controlling the degree of energization thereof by the electric generator.

2. In a vehicle brake system, in combination, an electrically operated valve device operative upon the variation of energization thereof to control the degree of application of the brakes, an electric relay device operative when energized to a predetermined degree to open a circuit through which said electrically operated valve device is energized, and operative upon reduction of said energization below said predetermined degree to close said circuit, an electric generator driven according to the speed of the vehicle and operable to produce a voltage proportional to said speed, and means for causing said electric relay to open the circuit to said electrically operated valve device at a particular speed when the vehicle is accelerating, and to cause said electric relay to close said circuit at the same particular speed when the vehicle is decelerating.

3. In a vehicle brake system, in combination, a brake cylinder, a valve mechanism including an electrically operated device, and being operative when said electrically operated device is energized to reduce the permissible degree of brake cylinder pressure, an electric relay for controlling a circuit through which current is supplied to energize said electrically operated device, an electric generator connected to said electric relay and operable to supply current thereto at a voltage which varies in accordance with the variation of the speed of the vehicle, and means associated with said electric relay and said electric generator for causing said relay to open the circuit to said electrically operated valve device at a predetermined speed when the vehicle is accelerating, and to close said circuit at the same predetermined speed when the vehicle is decelerating.

4. In a vehicle brake system, in combination, a volume control device having a chamber expansible upon the supply of fluid under pressure thereto, a brake controlling valve device having two chambers and being operable to effect an application of the brakes to one degree when fluid under pressure is established in both of said chambers, and to a different degree when fluid under pressure is established in one only of said two chambers, valve means for controlling communication between the chamber of said volume control device and one of said two valve device chambers, and speed controlled means for controlling the operation of said valve means.

5. In a vehicle brake system, in combination, a volume control device having a chamber so arranged that the volume thereof increases upon supply of fluid under pressure thereto, a valve mechanism having a plurality of movable abutments of unequal effective pressure areas and a chamber for and to one side of each of said abutments, said valve mechanism being operable to control the degree of application of the brakes according to which of said chambers is supplied with fluid under pressure, means for forming at all times a communication between the chamber in said volume control device and at least one of said valve mechanism chambers, and vehicle speed controlled means for controlling communication between said chamber in the volume control device and other of said valve mechanism chambers.

6. In a vehicle brake system, in combination, a valve mechanism having two independent chambers and being operable to control the degree of application of the brakes to one degree when fluid under pressure is supplied to both of said chambers, and to a different degree when fluid under pressure is supplied to one only of said chambers, a volume control device having a chamber the volume of which increases upon supply of fluid under pressure thereto, means for forming an always open communication between the chamber in said volume control device and one of the said chambers in said valve mechanism, a magnet valve device for controlling communication between the chamber in said volume control device and the other of said chambers of said valve mechanism, and an electric switch device governed by the speed of the vehicle for controlling the operation of said magnet valve device.

7. In a vehicle brake system, in combination, an electrically operated valve device for controlling the degree of application of the brakes, a source of electric current, means providing for an electric circuit between said source of current and said electrically operated valve device, a pneumatic switch device having contacts disposed in said circuit and being operable to close said contacts upon supply of fluid at a low pressure thereto, an electric relay having contacts also in said circuit, and being operable when energized below a predetermined degree to close its contacts and when energized above said predetermined degree to open its contacts, and means for controlling the energization of said relay according to the speed of the vehicle, and being operable to energize said relay to said predetermined degree at a particular vehicle speed when the vehicle is accelerating and to diminish the energization of said relay below said predetermined degree when the speed of the vehicle diminishes to a value slightly below said particular vehicle speed.

8. In a vehicle brake system, in combination, an electrically operated valve device for controlling the degree of application of the brakes, a circuit through which current is supplied to operate said electrically operated valve device, means governed by the speed of the vehicle when the brakes are applied for closing said circuit when the vehicle speed has diminished to a predetermined speed, and a cut-out switch device operable to open said circuit when the vehicle speed has diminished substantially to zero speed.

9. In a vehicle brake system, in combination, an electrically operated valve device operable upon supply of current thereto for controlling the degree of application of the brakes, speed controlled means operable when the brakes are applied at a time when the vehicle is traveling above a chosen speed for supplying current to said electrically operated valve device when the vehicle speed diminishes to said chosen speed, and a cut-out switch device operable as the vehicle comes to rest for interrupting the supply of current to said electrically operated valve device.

10. In a vehicle brake system, in combination, an electrically operated valve device operable upon supply of current thereto for controlling the degree of application of the brakes, speed controlled means operable when the brakes are applied at a time when the vehicle is traveling above a chosen speed for supplying current to said electrically operated valve device when the vehicle speed diminishes to said chosen speed, a cut-out switch device operable as the vehicle comes to rest for interrupting the supply of current to said electrically operated valve device, and means for delaying for a predetermined interval of time the effective operation of said cut-out switch device after the vehicle comes to rest.

11. In a vehicle brake system, in combination, a valve device having an electrical portion operative when energized to vary the degree of application of the brakes controlled by said valve device, a circuit through which current is supplied to operate said electrical portion, means operated when the brakes are applied at a time when the vehicle is traveling in excess of a certain particular speed for effecting the closing of said circuit when the vehicle speed diminishes to said certain particular speed, means for opening said circuit at or about the time the vehicle comes to rest, and means for delaying the operation of said last mentioned means for a predetermined interval of time.

12. In a vehicle brake system, in combination, an electric generator, electrical means governed by the voltage delivered by said generator for controlling the degree of application of the brakes, means independent of the generator and operated according to the speed of the vehicle for rendering said generator effective to deliver a voltage output so long as the speed of the vehicle is substantially above zero speed, and operative to render said generator ineffective upon decrease in vehicle speed to substantially zero speed.

13. In a vehicle brake system, in combination, a brake cylinder, a valve mechanism for controlling the supply of fluid under pressure to and its release from said brake cylinder, electrically controlled means for controlling the operation of said valve mechanism to vary the degree of brake cylinder pressure, an electrical relay for controlling a circuit to said electrically controlled means, an electric generator adapted to be driven according to the speed of the vehicle for supplying current to energize said electrical relay, and a cut-out switch device for controlling both the operation of said electric generator and the circuit to said electrically operated means, and being operable to open said circuit and to render said generator ineffective at or about the time the vehicle comes to rest.

14. In a vehicle brake system, in combination, electrical means for controlling the degree of application of the brakes, an electric relay for controlling the operation of said means, said relay being operable to open an electric circuit to said means upon the increase of energization thereof to a chosen degree, and being further operable to open said circuit only upon the decrease of energization thereof to a value substantially below said chosen degree, means for progressively increasing the degree of energization of said electric relay when the vehicle speed is increasing and for progressively decreasing the energization of said relay when the vehicle speed is diminishing, and means for causing said relay to open said circuit at a predetermined vehicle speed when the vehicle is accelerating and to close said circuit at the same predetermined speed when the vehicle is decelerating.

15. In a vehicle brake system, in combination, means for controlling the degree of application of the brakes, an electric relay having an energizing winding and a set of contacts for controlling said means, and a resistance device connected in series with said energizing winding and being adapted to be shunted when said contacts are closed and unshunted when said contacts are open, said winding being effective with said resistance shunted to open said contacts at a given supply voltage when said voltage is progressively increasing, and effective with said resistance unshunted to close said contacts at the same said supply voltage when it is progressively decreasing.

16. In a vehicle brake system, in combination, a brake cylinder, a valve mechanism for controlling the supply of fluid under pressure to and its release from said brake cylinder, an electrically operated valve device operable when energized to cause operation of said valve mechanism to reduce the degree of brake cylinder pressure, an electric circuit connected to said electrically operated valve device for supplying current thereto to cause the said operation, two sets of electric contacts in said circuit, means including an electric generator for controlling the opening and closing of one of said sets of contacts, and a rotary device for controlling the opening and closing of the other of said sets of contacts.

17. In a vehicle brake system, in combination, a brake cylinder, a valve mechanism for controlling the supply of fluid under pressure to and its release from said brake cylinder, a magnet valve device associated with said valve mechanism and operable when energized to cause said valve mechanism to reduce brake cylinder pressure, an electric circuit through which current is supplied to energize said magnet valve device, a set of contacts in said circuit, a rotary device for controlling said set of contacts and being operable when rotated above a predetermined speed for closing said set of contacts and when rotated below said predetermined speed for opening said contacts, and means associated with said rotary device for delaying for a predetermined interval of time the closing of said contacts when the speed of rotation of said rotary device diminishes below said predetermined speed.

CLYDE C. FARMER.